United States Patent [19]

Rhoades

[11] Patent Number: 4,995,949
[45] Date of Patent: Feb. 26, 1991

[54] ORIFICE SIZING USING CHEMICAL, ELECTROCHEMICAL, ELECTRICAL DISCHARGE MACHINING, PLATING, COATING TECHNIQUES

[75] Inventor: Lawrence J. Rhoades, Pittsburg, Pa.

[73] Assignee: Extrude Hone Corporation, Irwin, Pa.

[21] Appl. No.: 265,934

[22] Filed: Nov. 2, 1988

Related U.S. Application Data

[63] Continuation-in-part of Ser. No. 842,285, Mar. 21, 1986, abandoned.

[51] Int. Cl.$^5$ .......................... B23H 3/00; B23H 9/14; C25D 5/02
[52] U.S. Cl. .......................... 204/15; 204/26; 204/129.2; 204/129.55; 204/129.7; 219/69.17; 138/44; 427/248.1; 427/304; 156/626; 156/644
[58] Field of Search ............ 204/129.2, 129.55, 129.7, 204/26, 15; 138/44, 45; 219/69.17; 427/248.1, 304; 156/626, 644

[56] References Cited

U.S. PATENT DOCUMENTS

| | | | |
|---|---|---|---|
| 2,570,624 | 10/1951 | Wyckoff | 138/44 X |
| 2,687,147 | 8/1954 | Feichter | 138/44 |
| 3,228,863 | 1/1966 | Wanttaja et al. | 204/129.7 X |
| 3,349,619 | 10/1967 | Millar | 138/44 X |
| 3,399,125 | 8/1968 | Mikoshiba et al. | 204/129.7 |
| 3,480,530 | 11/1969 | Voorhies | 204/129.2 |
| 3,753,879 | 8/1973 | Blee | 204/129.2 |
| 4,147,481 | 4/1979 | Deutsch | 138/44 X |
| 4,455,470 | 6/1984 | Klein et al. | 204/129.7 X |
| 4,578,164 | 3/1986 | Matsui et al. | 204/129.7 X |

FOREIGN PATENT DOCUMENTS

| | | | |
|---|---|---|---|
| 193244 | 4/1967 | U.S.S.R. | 204/129.2 |
| 395246 | 5/1969 | U.S.S.R. | |
| 518326 | 2/1975 | U.S.S.R. | |

Primary Examiner—Donald R. Valentine
Attorney, Agent, or Firm—Waldron & Associates

[57] ABSTRACT

A method of processing an orifice in a structure to attain a precise predetermined flow resistance through said orifice. Undersized orifices are machined by either electrochemical, chemical or electric discharge machining, while oversized orifices are electroplated, electroless plated or vapor deposition coated, such that the processing fluid, i.e. the electrolyte, corrosive fluid, dielectric or carrier gas as used in the machining, plating or coating process is passed through said orifice during said processing at a predetermined fixed pressure while measuring the dynamic flow resistance of said processing fluid through said orifice until said dynamic flow resistance is equal to that desired.

13 Claims, 2 Drawing Sheets

ORIFICE SIZING USING CHEMICAL, ELECTROCHEMICAL, ELECTRICAL DISCHARGE MACHINING, PLATING, COATING TECHNIQUES

This application is a continuation-in-part of Application Ser. No. 06/842,285, filed Mar. 21, 1986 now abandoned.

BACKGROUND OF THE INVENTION

Fluid flow through orifices is common. Examples include fuel injector nozzle tips, carburetor jets, cooling air flow through turbine engine components, lubricating oil metering for precision bearings and the like. In many such applications, precision metering of flow rates is of very great importance, but due to manufacturing limitations, is of very great difficulty. Even very slight variations in manufacturing tolerances can produce substantial variations in flow resistance and flow.

In addition, parts are frequently cast or machined of a material chosen for specific properties, such as heat or electrical conductivity or insulation, lightness, coefficient of expansion during heating or cooling, cost, etc., but have a different set of requirements for the internal surface of the orifice. These specific internal passage requirements can be met by plating or coating with a metal having the desired properties. Plating may be done by either electroplating or electroless (autocatalytic) plating, while coating may be done by vapor deposition utilizing a carrier gas or other such technique. Electroless plating or vapor deposition is generally preferable for plating or coating the interior surface of castings, bores, etc. where secondary cathodes are very difficult to place for uniform electroplating.

Parts having fluid flow orifices are made by a wide variety of casting and machining procedures. For example, high quality investment castings are frequently employed for manufacture of such parts. Such parts will, nevertheless, have some variations in dimensions, particularly wall thicknesses attributable to slight core misalignment or core shifting, and other variations in surface conditions, including surface roughness, pits, nicks, gouges, blow holes, or positive metal. In the extreme, a very slight crack in a core can lead to a thin wall projecting into an internal passage. All these factors will substantially alter fluid flow..

Commonly employed machining methods such as conventional and electrical discharge machining and less common techniques such as laser, electron beam electrostream, and STEM drilling are not sufficiently precise to avoid the generation of substantial variations in flow resistance. Even the most precise of these methods, electrical discharge machining, will not produce perfectly uniform flow resistance since the length of an internal passage may vary as an incident of casting operations, giving rise to fluctuations of hole length and flow resistance despite the uniformity of the hole diameter. In addition, non-uniform electrical discharge machining conditions are inevitable and may produce variations in size, shape, surface finish and hole edge conditions.

Orifices to be plated or coated must be sufficiently oversized to allow for the plating or coating thickness and the ultimate precision depends upon accurate calculations for plating or coating rates and precision in the drilling and plating processes. With current technology the resulting product is insufficiently uniform for most high precision industrial applications, thus restricting the manufacturer's options to producing the entire part from materials with the desired orifice properties or embedding drilled parts with the prescribed properties into castings designed to hold them. These techniques have the precision problems associated with drilling as discussed above. The plating of orifices drilled into one material with metal of different properties, or even the same metal, in such a manner as to provide precision flow, adds new options to the manufacture of many parts.

At present, the inherent deviations of the drilling processes are necessarily tolerated with broad limits, and the attendant compromises in design freedom, performance, and efficiency are accepted as unavoidable. For example, the delivery of fuel charges to internal combustion engines by pressurized fuel injection requires metering of flow through injectors. Greater precision in flow regulation will enable greater fuel efficiency, economy and precision of the engine operation. At present, the design of such fuel metering systems is often based on measurement of actual flow resistance and segregation of inventories within ranges of flow parameters to provide at least approximate matching of components in inventory within a range of deviation from defined tolerances. Such operations are a considerable expense because of the substantial inventory requirements. In addition, a substantial number of components must be rejected as out of allowable deviations and must be reworked at considerable expense or discarded.

At the present time, fuel injector nozzles are machined with the critical flow metering orifices formed by conventional electrical discharge machining. As shown in FIG. 1, the most critical flow resistance determinants are considered to be the diameter of orifices 10, 11, and wall thickness at section line A—A, as well as edge condition and surface roughness, including "lay" of the finish. The design specifications are for a wall thickness at this section of 0.040 inches ±0.002 inches. Parts outside these specifications are rejected. Accepted parts are segregated in inventory into eight ranges, +0.00025 inches. Those of ordinary skill in the art have long been aware that wall thickness at A—A is an indirect determinant of flow resistance of orifices 10, 11, and that the accurate control of the diameter of orifices 10, 11, is a direct determinant of flow resistance. These parameters determine flow metering properties, and a more direct measure of flow resistance of the part and a direct control in manufacture of such flow resistance is highly desirable.

Another example of flow resistance through an orifice of significant criticality if the provision of cooling air flow through gas turbine engine components, such as turbine blades. As shown in FIGS. 3 and 4, investment cast turbine blades are typically cast or drilled (by laser drilling, STEM drilling, or electrical discharge machining), to provide a plurality of holes, typically having a nominal diameter of about 0.010 to 0.030 inches, passing from the interior passage to the vicinity of the leading edge, trailing edge, and elsewhere along the airfoil. Cooling air is forced from the interior, out the plural holes, and into the high temperature combustion gas stream to provide cooling of the blade. Sometimes holes through internal walls of the blade meter the distribution of cooling air. It is reasonably apparent that variations in flow resistance can result in different cooling effects which can result in hot spots which may alter the heat balance within the components and the engine itself and affect both performance and component life. Cooling air usage should however be minimized as its excessive usage reduces engine efficiency by "stealing" compressor section energy. More precise control of flow resistance of these orifices can provide substantial benefits in operation of such components and of the units into which they are assembled.

In addition to fuel injector nozzle tips, carburetor jets, cooling air flow through turbine engine components and lubricating oil metering for bearings, there are numerous other applications of flow control orifices to which the present invention is applicable. The foregoing examples are merely representative which serve to illustrate the state of the art and the problem addressed and solved by the present invention.

OBJECTS OF THE INVENTION

It is an object of the present invention to provide a method of processing flow controlling orifices in structure by either machining, plating or coating to attain a precise flow resistance.

It is a further object to provide such a method as will yield a precise predetermined flow resistance.

Another object is to provide such method whereby a plurality of flow controlling orifices can be provided with closely matched flow resistance.

Still another object is to provide a method whereby a continuing plurality of parts can be made having predetermined flow resistance with high levels of precision and reproducibility.

Yet another object is to provide a method of attaining a predetermined flow resistance through an orifice by controlling the orifice forming operation through a parameter which is a direct determinant of, or a direct consequent of flow resistance.

A further object is to provide parts and components having orifices with reproducible, precise, predetermined flow resistances.

A further object is to provide parts and components having orifices with predetermined, precise and reproducible flow resistances when the component is of a material which is a non-conductor of electricity.

A further object is to provide parts and components having orifices with predetermined, precise and reproducible flow resistances where the interior surface material is different from that which is drilled, being plated or coated onto the interior of the orifice.

Still another object is to provide "tuned" turbine engine components.

SUMMARY AND BRIEF DESCRIPTION OF THE INVENTION

The present invention is based upon the action of electrochemical, chemical or electrical discharge machining (material removing techniques) or plating or coating (material building techniques) upon a part to provide a constant, predetermined rate of flow of the processing fluid used in said machining, plating or coating process, through an orifice, where the dynamic rate of the processing fluid is directly related to the target rate of flow through the orifice of the fluid of ultimate intended use. By "processing fluid" is meant the liquid or gas that is utilized during the machining, plating or coating process, specifically, the electrolyte in the case of electrochemical machining and electroplating and electroless plating, the corrosive chemical solution whether caustic or acid in the case of chemical machining, the dielectric in the case of electrical discharge machining and the carrier gas in the case of vapor deposition. "Processing" as used herein is therefore limited to electrochemical, chemical and electrical discharge machining and to electroplating, electroless plating, vapor deposition and the like. It is possible to control the flow of the processing fluid by the application of a constant pressure or by a predetermined rate of displacement of a driving piston of constant area. Other methods to control the flow of the processing fluid are available depending on the means utilized to drive the processing fluid. If either pressure or flow rate is set, the other factor will be determined by processing fluid viscosity and orifice dimension and geometry.

While there is at least one prior art process for controlling the machining or polishing of orifices using hydrodynamic machining, i.e. as taught in Soviet Patent 518,326, such a technique is not satisfactory with other machining processes as utilized herein. In the process taught in the Soviet patent, a recirculating system is utilized wherein the machining fluid pressure is monitored downstream from the orifice being machined, and the machining action stopped when the downstream pressure reaches a predetermined value corresponding to the desired orifice cross-section. While this process may be satisfactory for hydrodynamic machining, it would not be suitable for other machining, plating or coating processes as utilized in this invention where substantially lower fluid flow rates are involved.

DETAILED DESCRIPTION OF THE INVENTION

Figure 1:
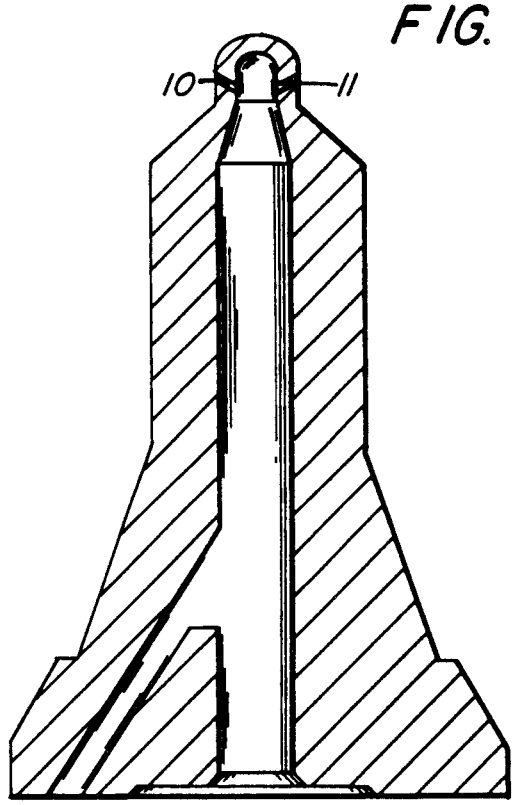
FIG. 1 is a cross-sectional view of a fuel injector metering nozzle.
Figure 2:
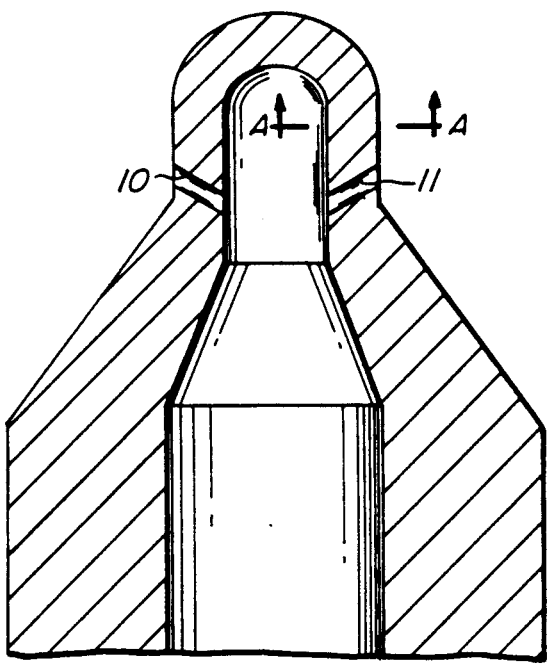
FIG. 2 is an enlarged detail view of a portion of FIG. 1, showing the metering orifices 10, 11.
Figure 3:
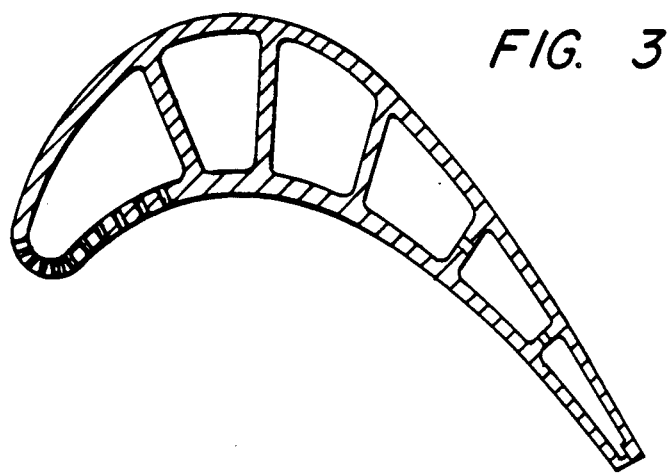
FIG. 3 is a cross-sectional view of a turbine blade showing cooling air metering orifices through the leading edge, trailing edge, air foil, and internal walls.
Figure 4:
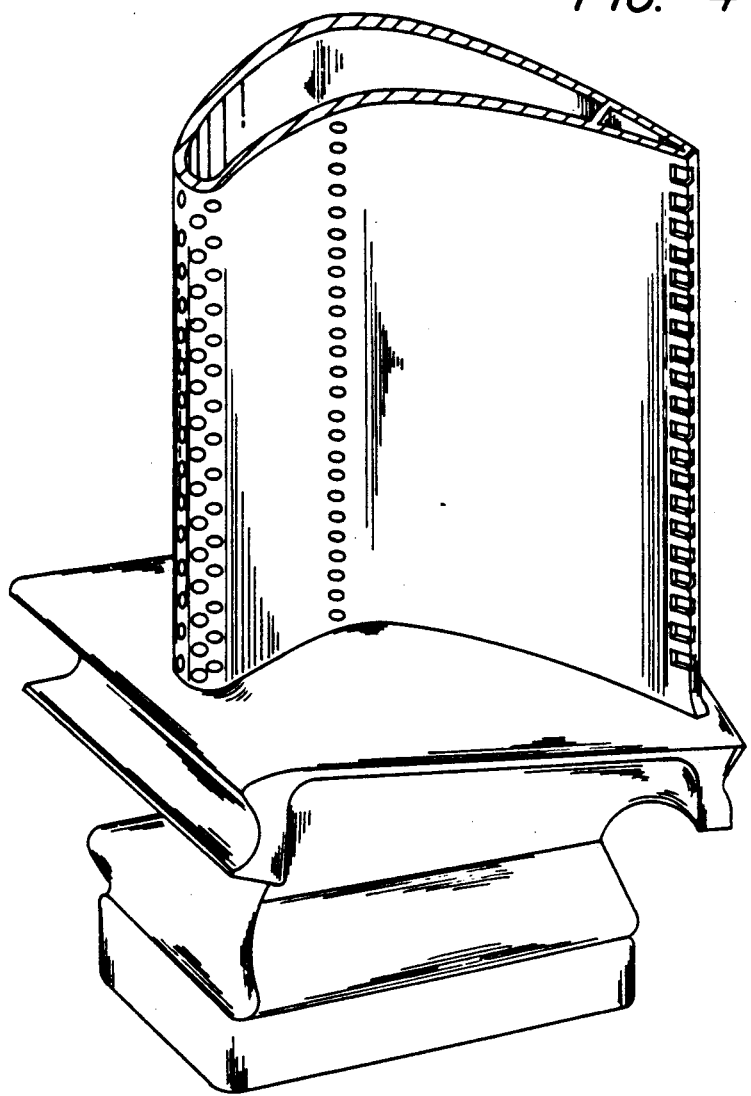
FIG. 4 is a perspective view showing the overall configuration of the turbine blade of FIG. 3.

Electrochemical, chemical and electrical discharge machining are widely employed procedures for working metals and related materials, particularly for machining and finishing operations on internal shapes, bores, apertures, complex three dimensional shapes, and other difficult operations.

Electrochemical, and to a lesser extent chemical machining are used for deburring, radiusing, re-sizing, and polishing and finishing operations, often in internal shapes which are extremely difficult to process by other machining techniques, including orifices such as those which are the principal concern of the present invention. Electrochemical machining is also used for drilling. It is known that flow resistance through an orifice can be decreased by electrochemical, chemical and electrical discharge machining, and that an orifice can be enlarged by such operations.

Electrochemical machining, as employed in the present invention, refers to machining operations performed by anodic reduction of the workpiece. This operation is effected by the application of an electrical potential across the gap separating the workpiece (anode) from the toolpiece (cathode) while forcing an electrolyte solution through said gap in order that an electrical current might flow between the two electrodes carrying material from the anode into the electrolyte, whereupon it is washed away.

Chemical machining, as employed in the present invention, refers to machining operations performed by forcing a chemically corrosive fluid, either acid or caustic and either gaseous or liquid, which will chemically dissolve the material of the workpiece, across the surface which is to be machined in order to increase the rate of flow of liquids or gases in its ultimate intended use.

Electrical discharge machining, as employed in the present invention, refers to machining operations performed by a succession of rapid electric spark discharges between a conductive tool and a conductive workpiece with a dielectric fluid circulated therebetween, whereby each discharge spark removes a small portion of the material of the workpiece across from the tool.

Typically for any machining operation, a part or workpiece is fixed in a stationary tool and the processing fluid is hydraulically pumped through the passages formed by the part and its associated tooling at substantial pressure (and with appropriate applied electrical potential in the case of electrochemical and electrical discharge machining) until the desired degree of surface working is performed. Hydraulic cylinders or mechanical pumps are typically employed to pump said fluids through said passages. Electrochemical, chemical and electrical discharge machining as employed in the present invention do not include the flow of any physically abrasive materials, suspended, slurried or embedded, in fluid media such as cutting fluids, honing fluids, semisolid gels or gas streams and the like, but rather are limited to electrolyte or dielectric solutions solely for the purpose of electrical charge conduction or chemically corrosive fluids which operate by chemical attack upon the surface of the workpiece material.

It is important to note that all forms of abrasive machining, whether by gas suspension, liquid slurry or gel embedding of abrasive particles, have the shortcoming that harder materials require longer machining times and more rapid renewal of the abrasive material. Because the abrasive material is not easily filtered, it is possible for very small orifices that orifice opening can be blocked due to bridging of larger abrasive particles. Additionally gas suspension and liquid slurry abrasive particle machining exhibit limitations in directing the abrasive action to target surface areas within the flow channel where, due to turbulence, no particle flow is generated. In addition, cleaning of the finished workpiece is far easier with fluid processing than it is with abrasive flow. Still another possible disadvantage, and the most important, is that the abrasive filled fluid may not flow precisely like the fluid the orifice is intended to control.

Electrochemical machining is a process ideally suited to many applications of finish machining. The conditions for electrochemical machining are mild (below 80° C.) and the electrolyte solution can generally be 10% (w/w) sodium chloride or sodium nitrate in water. Electric potentials are kept below 50 volts, generating current densities typically no greater than about 0.65 ampere/mm$^2$. Conditions of gap size (generally 0.025–0.50 mm) and current density appropriately set to prevent sparking, and adequate flow of electrolyte will yield controlled ablation of the workpiece surface, unaffected by material hardness. Nonuniformities are created by boundary layer electrolyte flow differences due to local turbulence and general flow rate through the channel. These differences in electrolyte flow at the workpiece surface create discontinuities in current densities, but in general, tend to favor preferential working of projections into the main flow and also tend toward greater uniformity as machining continues to produce a more uniform internal surface. The result will be a smooth, nearly blemishfree surface worked preferentially in a manner determined by tool shape and positioning. It is within the skills of those knowledgeable in the industry to determine and set the parameters for such a machining process.

For the process of chemical machining, the rate of surface working is directly proportional to the chemical susceptibility of the material to the chemically corrosive fluid, rather than to the hardness of the material. The rate of chemical reaction can be controlled by corrosive agent concentration, flow rate and temperature. Working of the surface is essentially uniform except for variabilities in boundary layer thicknesses and mixing rates created by local turbulence and variations in the major flow rate across the surface, which is governed by cross-sectional area of the channel. Choosing proper etching parameters for the creation of a smooth, uniform surface are within the skill of those knowledgeable in the industry. Specific advantages to chemical machining include the ability to work materials which are not electrically conductive and the ability to use a gaseous machining fluid.

Electrical discharge machining provides a great degree of accuracy in cutting hard or hardened materials. Because the spark discharge focuses first on peaks, corners and protrusions, burr-free machining occurs naturally. The dielectric fluid is usually a hydrocarbon oil or deionized water which serves first to insulate the gap between the tool and workpiece, which subsequently becomes ionized when the electrical potential between the tool and workpiece reaches a given limit allowing the spark to discharge through the ionized dielectric. The flow of fresh dielectric fluid cools the tool and workpiece and again reinsulates the gap until the potential again reaches the given limit to permit the spark to discharge. Material removal rate as well as surface roughness both increase with increasing current or decreasing frequency.

For either electrochemical, chemical or electrical discharge machining it is necessary to hold the workpiece so as to confine the flow of the processing fluid past the area to be treated. In the case of electrochemical and electrical discharge machining, it is also necessary to insulate the workpiece and tool for proper flow of electric current. In the case of an opening through the workpiece, special adapters or tooling may be required to pass the processing fluids into a certain opening and out of a certain opening in the workpiece. This is merely within the skill of the industry.

It is the general practice in chemical machining to employ a fixed number of cycles of a corrosive fluid at a fixed pumping cylinder pressure and a fixed volume of said fluid to achieve the desired degree of workpiece reduction. It is a general practice in electrochemical machining to apply a fixed electrical potential across the electrodes for a fixed period of time while pumping electrolyte continuously at a rate sufficient to carry the requisite current. Such parameters are ordinarily determined empirically for a given workpiece and tooling combination to provide suitable results.

Electroplating, electroless plating and vapor deposition are widely employed procedures for adding finished surface layers of various metals, alloys or metal-nonmetal composites to either metallic or nonmetallic parts. Such metallic surface layers are primarily used to impart certain features of wear resistance, chemical inertness, electrical conductivity, magnetic properties or surface luster to the item being plated or coated where the desired finish is not a property of the part. Electroplating, electroless plating and vapor deposition are not generally considered to be techniques for finish sizing of orifices.

Electroplating as employed in the present invention refers to plating operations performed by applying an electric potential across the gap separating the workpiece (cathode) and an anode. An electrolyte containing the ionized metal to be plated and appropriate buffering ions is circulated between the electrodes. The resultant flow of electric current causes reduction of the metallic ion at the surface of the cathode (workpiece), thus yielding a plating of the elemental metal. The thickness of the plated layer is a function of the plating time, electrical potential and ion concentration, and can be modulated by choosing appropriate plating conditions. The selection of these conditions is within the capacity of those skilled in the art. Virtually any metal which can be ionized is a potential candidate for electroplating applications.

The primary shortcoming of electroplating techniques lies in their inherent inability to create a layer of deposited metal of uniform thickness. This is particularly the case with parts of nonuniform surface conformation, especially the internal surfaces of bores and chambers. In fact, electroplating the internal surfaces of bores or chambers can only be accomplished by the placement of auxiliary anodes within such interior bores or chambers uniformly spaced from the surfaces to be plated. This is particularly difficult for small bores and for irregular configurations.

This specific shortcoming of electroplating is obviated under select conditions when used as an embodiment of the present invention. The requirements are that the entire interior of the part need not be plated with the metal, but that deposition of metal at the orifice, such that the resultant orifice diameter and/or length provides the specified and precise flow of the ultimate intended fluid, be sufficient for the intended use.

Electroless plating as employed in the present invention refers to processes of galvanic displacement and autocatalytic reduction of metal ions in an electrolyte solution in the absence of electric current, such that a layer of metal is deposited on surfaces exposed to said electrolyte solution. The electrolyte solution typically contains the metal cation and its anion, a reducing agent, an organic chelating agent such as EDTA, and a buffer, frequently a carboxylic acid salt. The most frequently used reducing agent is sodium hypophosphite, although sodium borhydride, amine boranes, and others can also be used.

A characteristic of electroless plating is that coprecipitation of the desired metal and other components of the electrolyte occur. Generally, the coprecipitation is the phosphorus or boron of the reducing agent (approximately 10% of the deposited material). This "contamination," though once a problem with the method, is now exploited to yield platings which are harder, or have other properties different from the electroplated counterpart. The coprecipitation process has been extended further to produce metallic layers with inclusions of particulate alumina, diamond, silicon carbide and other carbides for increased wear resistance, ceramics and plastics for individualized properties, and even PTFE to add lubricating properties to the surface. Heat treatments are frequently required to realize maximum hardness characteristics of the plate deposited by the electroless technique.

Electroless plating is the method of choice for plating nonconductors of electricity, irregularly shaped parts, especially those with apertures, chambers and bores, because this process yields a uniform layer of metal (or composite) on all surfaces. Plating thickness is dependent upon the time and other factors associated with the electrolyte which are within the skill of the art to control. However, traditional control methods are not precise enough to yield plated parts with orifices delivering volumes of fluid within the constraints of uniformity necessary for the types of parts for which this invention applies. It is for this reason that plating techniques have not been employed for finish work on bored parts. Through application of the present invention, electroless plating can bestow the dual advantages of plating an internal passage with a metal of choice, while producing an orifice with precise flow properties. The electroless plating technique is applicable to, but not limited to, plating of copper, nickel, gold, tungsten, palladium, tin, cobalt, zinc, zirconium, chromium, lead, cadmium, platinum, silver, aluminum, titanium and their alloys.

Vapor deposition as employed in the present invention refers to the nonelectrolytic deposition of metals onto a substrate from a reactive vapor carried in a carrier gas, and is usually referred to as chemical vapor deposition. Vapor deposition processes which rely of conveyance of metal vapors through a vacuum would not be applicable to this invention. In chemical vapor deposition, the workpiece to be coated is placed in a sealed chamber and heated while a reactive vapor, typically consisting of a metal halide or carbonyl is carried therethrough with hydrogen gas. Deposition of the pure metal onto the workpiece occurs either by hydrogen reduction or thermal decomposition. The vapor deposition of compounds such as carbides, nitrides and borides can be effected by including reactive gases with the hydrogen such as methane, nitrogen and trichloride respectively.

For electroplating, electroless plating and vapor deposition in applications apropos to the present invention, the workpiece must be held in an apparatus such that the processing fluid flow is confined to passage through the orifice(s) to be plated or coated and sized. In addition, for electroplating the apparatus must be insulated for proper flow of electric current. Such techniques are within the skill of the industry.

It has been discovered that in addition to all the foregoing features and uses, electrochemical, chemical and electrical discharge machining and plating and coating can be directly employed and controlled to govern flow resistance of an orifice by performing said machining, plating or coating operations to a predetermined rate of flow of processing fluid through the orifice at a constant applied pressure, or other equivalent determinant of the dynamic flow resistance of the orifice being sized. It has been observed that such flow resistance during the working operation is directly correlatable with flow resistance of other fluids through such an orifice, even at greatly different pressure. In addition, where minor discrepancies in such a correlation result in unacceptable variability, it is an aspect of the present invention to modulate the viscosity of the processing fluid to approximate as closely as possible the viscosity of the fluid of ultimate intended use under the intended environmental conditions.

In the following discussion, the following terms are employed:

| | | |
|---|---|---|
| $t$ | = | Time at flow rate |
| $A_p$ | = | Piston Area |
| $P_p$ | = | Piston pressure applied to processing fluid |
| $D_p$ | = | Piston axial displacement distance |
| $V_p$ | = | Piston Velocity = $D_p/t$ |
| $Q_p$ | = | Piston Volume displacement = $A_p \times D_p$ |
| $A_o$ | = | Orifice area |
| $P_o$ | = | Orifice pressure |
| $D_o$ | = | Orifice axial distance of fluid flow |
| $V_o$ | = | Orifice velocity (rate) of flow of processing fluid |
| $Q_o$ | = | Orifice volume of flow |

The objective attained by the present invention is to attain a predetermined value of $V_o$ at a fixed pressure $P_o$ which is related to a benchmark rate of flow of some specified fluid at some operating pressure for the orifice in its intended working environment. This is often obtained empirically, although it can theoretically be calculated based on viscosity, pressure, volume, and orifice dimensions. In manufactured parts, however, calculation of $V_o$ target values can be difficult or uncertain and may generally not be preferred.

Alternatively, specific values of $P_o$ can be targeted by pumping the processing fluid with or without applied voltage at a constant velocity $V_o$ and continuing processing until the orifice pressure drops or rises to the target $P_o$, depending upon whether the orifice is being machined or plated.

Empirical determination of $V_o$ is readily obtained by selecting two prototypical parts having known orifices which provide known rates of flow of the intended working fluid under conditions of the intended working environment. By interpolation, these parts are employed as a comparative benchmark to measure $V_o$ at $P_o$ to establish the predetermined value of $V_o$ for use in processing with the proper processing fluid.

Actual values of $V_o$ are determined in accordance with the following considerations in the case of a single orifice:

$$Q_o = Q_p \text{ by definition}$$
$$V_o = D_o/t \text{ by definition}$$
$$= Q_o/A_o/t$$
$$= Q_p/A_o/t$$
$$= A_p \times D_p/A_o/t$$
$$V_o = k\, D_p/t \text{ where } k = A_p/A_o,$$
(approximately constant)

Both $D_p$ (if the processing fluid is liquid) and t are relatively easy to determine with a high degree of precision and accuracy. Given that the value of $A_o$ changes only slightly as the process proceeds, it is effective to treat k as a constant where the time interval, t, is small. This approximation is valid for time intervals, t, of less than about one second. In practice, it is often convenient to use sampling rates at an interval of t=0.1 seconds or less. This presumes, however, that other parameters such as $P_p$, temperature and concentration in the processing fluid are maintained substantially constant. In the case of electrochemical machining and electroplating, the current density is also presumed as being maintained substantially constant. All of these parameters and factors can be readily maintained constant within acceptable limits.

In operation, a determination of the target $V_o$ and k benchmarks permits matching $V_o$ of a multiplicity of pieces to the target by measuring $D_p$ and t and computing $kD_p/t$, and continuing the processing until the requisite value is attained. In a comparable manner for electrolytic processes, amper-seconds can be maintained as a constant value.

As those of ordinary skill in the art will appreciate, $P_p$ is an independent variable in these processes and need not be maintained as constant. Equivalent results can be obtained if $D_p$ is maintained constant and $P_p$ is varied and measured in the operation or if both $P_p$ and $D_p$ are varied and measured simultaneously. Such operations are equivalent and are considered within the scope of the present invention.

Where the processing fluid is gaseous $D_p$ may not be the most accurate measure of moved processing fluid. Particularly for small orifices, therefore, a greater degree of accuracy may be achieved by directly measuring the volume or weight of the processing fluid passing through the orifice by other means.

When multiple orifices in a single workpiece or multiple workpieces are to be processed in parallel, simultaneous electrochemical, chemical or electrical discharge machining, or plating or coating the considerations are essentially the same. In this type of application it may be necessary to measure the volume or weight of processing fluid passing through each individual orifice. This will permit independently stopping the flow of processing fluid through the individual orifices as the desired flow resistance is achieved while permitting the flow to continue through other orifices until each achieves the desired flow resistance.

It is generally preferred that the orifice dimensions of the unworked workpieces or parts be sufficiently undersized in the case of electrochemical, chemical or electrical discharge machining, or oversized in the case of electroplating, electroless plating or coating so that substantially all workpieces or parts require, at least to a degree, machining, plating or coating to attain the target $V_o$ value. It is generally preferred but not essential that at least about 5 seconds of processing time be required so that there is some assurance of steady operating conditions of flow and measurement. This serves to minimize rejection of parts for oversize or undersize orifices, since processing is continued to the target $V_o$.

The amount of material to be removed by the electrochemical, chemical or electrical discharge machining operations or added by the plating or coating operations will, in most circumstances, be rather small, involving in most cases an enlargement or constriction of the diameter of the orifice on the order of less than a mil or a few mils or in some instances a few tens of mils. In many cases, the radiusing of the entrance edge of the orifice alone is sufficient to significantly reduce or increase the flow resistance of the orifice. With appropriate selection of the electrolyte solution, current density, gap size and tool shape, for electrochemical machining, or the appropriate corrosive fluid, concentration and operating parameters for chemical machining, or appropriate current, dielectric fluid and discharge frequency for electrical discharge machining, or electrolyte concentration and field strength for electroplating, or electrolyte concentration for electroless plating, or carrier gas concentration for vapor deposition, these operations can be achieved in quite brief operating cycles. Care must be taken that the operating cycle is not so brief that the ability to measure and control is lost.

It is important to recognize that the methods of the present invention operate to attain a specific dynamic property in the use of the orifice and not specific dimensions. For example, when the length of an orifice is greater than the designed value, due to a core shift in the casting operation for example, it will have a greater flow resistance than a short passage of exactly the same diameter. Pursuant to the above described methods of the present invention, longer passages will be enlarged more or plated less than short ones so that the resulting resistances to flow are equalized.

As an alternative to the above primary procedure whereby longer passages are enlarged more or plated less, the processes of this invention can be utilized to shorten longer passages or lengthen shorter passages to establish the desired resistance to flow without significantly affecting hole diameter. In this embodiment of the present invention, as illustrated in FIG. 5, the interior chamber of the workpiece is preferentially machined, plated or coated for the purpose of reducing or increasing the wall thickness of the workpiece adjacent to the orifice having a flow resistance to be adjusted. As in the above described methods, this embodiment is based on the use of electrochemical, chemical or electrical discharge machining or plating or coating processes to shorten or enhance the workpiece wall thickness adjacent to the orifice of concern. In the practice of this embodiment by any of the listed methods the procedure is the same except that the machining, plating or coating is set up to machine, plate or coat the overlength or underlength wall while the processing fluid is passed through the the adjacent orifice while measuring its flow resistance. When the flow resistance reaches its target value, the machining, plating or coating operation is stopped. The selective machining, plating or coating of one wall as opposed to the other is within the skill of the art. In electrochemical machining, electric discharge machining and electroplating for example, the wall to be machined or plated can be preferentially machined or plated by maintaining the working cathode or tool closer to that wall than to the other. In chemical machining, electroless plating and vapor deposition, the wall not to be worked can be coated to prevent chemical attack thereon or plating thereon, or otherwise isolated from the process.

The influence of various orifice conditions on the flow rate of the processing fluid may vary from that of the fluid the orifice is intended to meter. For instance, surface roughness, edge radius, and orifice diameter and length may affect flow of the processing fluids differently than the flow of air, water, or fuel.

For purposes of determining $V_o$ values for accurate regulation of processing the parts by any of the above disclosed techniques, the primary difference between the fluids intended for use and the processing fluids is viscosity. For maximum accuracy in determining $V_o$ values, the viscosity of any processing fluid may be increased or decreased by modifying or altering the composition of the solvent. This may include replacing all or part of one or more solvent components in the solution with another solvent, or by adding inert thinning or thickening components to the solution. The only specific limit on such modification of these solutions is that sufficient solvation of ions or corrosive chemical etc. must be retained for purposes of meeting the requirements of the machining, plating or coating process. Alternatively, if the intended fluid for the part is a gas, a corrosive gas or gas mixture can be used for the machining process, while vapor deposition would be the ideal choice for coating the orifice, thereby allowing accurate determination of $V_o$ values. If the machining solution cannot be adjusted to conform to the viscosity of the fluid intended to be metered, an appropriate "test" fluid can be used to quantify the standard orifice. The "test" fluid flow information combined with the initial processing fluid flow rate can be incorporated into an algorithm that will target the processing fluid flow rate that will correspond to the target "test" fluid flow rate.

What is claimed is:

1. The method of attaining a specific flow resistance of a fluid through an orifice in a structure by processing said orifice with a process utilizing a processing fluid, said process selected from the group consisting of chemical machining, electrochemical machining, electrical discharge machining, electroplating, electroless plating and vapor deposition, wherein said processing fluid is caused to flow through said orifice by a mechanical pump, said method comprising:
   A. Determining a target flow resistance of said processing fluid at a constant applied pressure as will provide said specific flow resistance of said fluid;
   B. Pumping said processing fluid through said orifice with said mechanical pump to process said orifice while maintaining said constant applied pressure with said mechanical pump;
   C. Measuring the dynamic flow resistance of said processing fluid through said orifice while said processing fluid is being pumped therethrough, and permitting the volumetric flow rate of said processing fluid to change in direct proportion to the processing effected on said orifice for the purpose of maintaining said constant applied pressure with said pump; and
   D. Stopping the processing of said orifice when said dynamic flow resistance is equal to said target flow resistance.

2. The method of claim 1 wherein said dynamic flow resistance is measured as a function of the axial displacement of said piston per unit time.

3. The method of claim 2 wherein said function is $V_o = kD_p/t$.

4. The method of claim 3 wherein $k = A_p/A_o$.

5. The method of claim 2 wherein said unit time is equal to or less than one second.

6. The method of claim 2 wherein said unit time is less than or equal to 0.1 second.

7. The method of attaining a specific flow resistance of a fluid through an orifice in a structure by processing said orifice with a process utilizing a processing fluid, said process selected from the group consisting of chemical machining, electrochemical machining, electrical discharge machining, electroplating, electroless plating and vapor deposition, wherein said processing fluid is caused to flow through said orifice by a mechanical pump, said method comprising:
  A. Determining a target flow resistance of said processing fluid at a constant volumetric flow rate as will provide said specific flow resistance of said fluid;
  B. Pumping said processing fluid through said orifice with said mechanical pump to process said orifice while maintaining said constant volumetric flow rate with said mechanical pump;
  C. Measuring the dynamic flow resistance of said processing fluid through said orifice while said processing fluid is being pumped therethrouqh, and permitting the applied pressure of said processing fluid to change in inverse proportion to the processing effected on said orifice for the purpose of maintaining said constant volumetric flow rate with said mechanical pump; and
  D. Stopping the processing of said orifice when said dynamic flow resistance is equal to said target flow resistance.

8. The method of attaining a specific flow resistance of a fluid through an orifice in a structure by processing said orifice with a process utilizing a processing fluid, which is caused to flow through said orifice by displacement of a piston, said method comprising:
  A. Determining a target flow resistance of said processing fluid at a constant applied pressure as will provide said specific flow resistance of said fluid;
  B. Flowing said processing fluid through said orifice by displacement of said piston to process said orifice while maintaining said specific constant applied pressure with said piston
  C. Measuring the dynamic flow resistance of said processing fluid through said orifice while said processing fluid is flowing therethrough; and
  D. Continuing to process said orifice and said flowing of said processing fluid until said dynamic flow resistance is equal to said target flow resistance.

9. The method of claim 8 wherein said dynamic flow resistance is measured as a function of the axial displacement of said piston per unit time.

10. The method of claim 8 wherein said function is $V_o = kD_p/t$.

11. The method of claim 10 wherein $k = A_p/A_o$.

12. The method of claim 8 wherein said unit time is equal to or less than one second.

13. The method of claim 8 wherein said unit time is less than or equal to 0.1 second.

* * * * *